US007087670B2

(12) United States Patent
Hoch et al.

(10) Patent No.: US 7,087,670 B2
(45) Date of Patent: Aug. 8, 2006

(54) FLAME-RESISTANT INTUMESCENT MIXTURES

(75) Inventors: Martin Hoch, Heinsberg (DE); Gert Jabs, Odenthal (DE); Otto Mauerer, Leichlingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 103 days.

(21) Appl. No.: 10/276,866

(22) PCT Filed: May 7, 2001

(86) PCT No.: PCT/EP01/05144

§ 371 (c)(1),
(2), (4) Date: Nov. 15, 2002

(87) PCT Pub. No.: WO01/88029

PCT Pub. Date: Nov. 22, 2001

(65) Prior Publication Data

US 2003/0125447 A1  Jul. 3, 2003

(30) Foreign Application Priority Data

May 19, 2000  (DE) ................................ 100 24 421

(51) Int. Cl.
*G08K 3/04* (2006.01)
*G08K 3/18* (2006.01)
*G09K 21/06* (2006.01)

(52) U.S. Cl. ...................... 524/495; 524/401; 524/430; 523/179

(58) Field of Classification Search ................ 524/401, 524/430, 495; 525/187; 523/179
See application file for complete search history.

(56) References Cited

U.S. PATENT DOCUMENTS 3,574,644 A * 4/1971 Olstowski et al. .......... 523/200
5,719,199 A * 2/1998 Wallace et al. ............... 521/82
6,410,122 B1 * 6/2002 Tono et al. .................. 428/212

FOREIGN PATENT DOCUMENTS

| DE | 41 35 678 | | 5/1993 |
| JP | 03041163 A | * | 2/1991 |
| JP | 03041164 A | * | 2/1991 |
| JP | 07068362 | | 7/1995 |
| JP | 95103948 | | 11/1995 |
| JP | 9-176579 | | 7/1997 |
| JP | 10-36572 | | 2/1998 |

OTHER PUBLICATIONS

**Database WPI Section Ch, Week 199114 Derwent Publications Ltd., London, GB; AN 1991-097794 XP002180730 & JP 03 041164 A (Nippon Kasei KK), Feb. 21, 1991 Zusammenfassung.
**Database WPI Section Ch, Week 199737 Derwent Publications Ltd., London, GB; AN 1997-399689 XP002180731 & JP 09 176404 A (Sekisui Chem Ind Co Ltd), Jul. 8, 1997 Zusammenfassung.

* cited by examiner

*Primary Examiner*—Tae H. Yoon
(74) *Attorney, Agent, or Firm*—Jennifer R. Sang

(57) ABSTRACT

The invention relates to mixtures containing
a) a polymer which may be produced from ethylene, vinyl acetate and optionally further monomers having a vinyl acetate content in the range of 40 to 85 wt. %,
b) at least one expandable graphite which may be acidic or neutralised,
c) at least one mineral filler,
d) optionally further additives, a process for producing them, their use for the production of shaped articles of any type, and flame-retardant intumescent mixtures containing a mixture according to the invention and, furthermore, shaped articles containing a mixture according to the invention.

15 Claims, 1 Drawing Sheet

Flammability test according to UL 94V-0
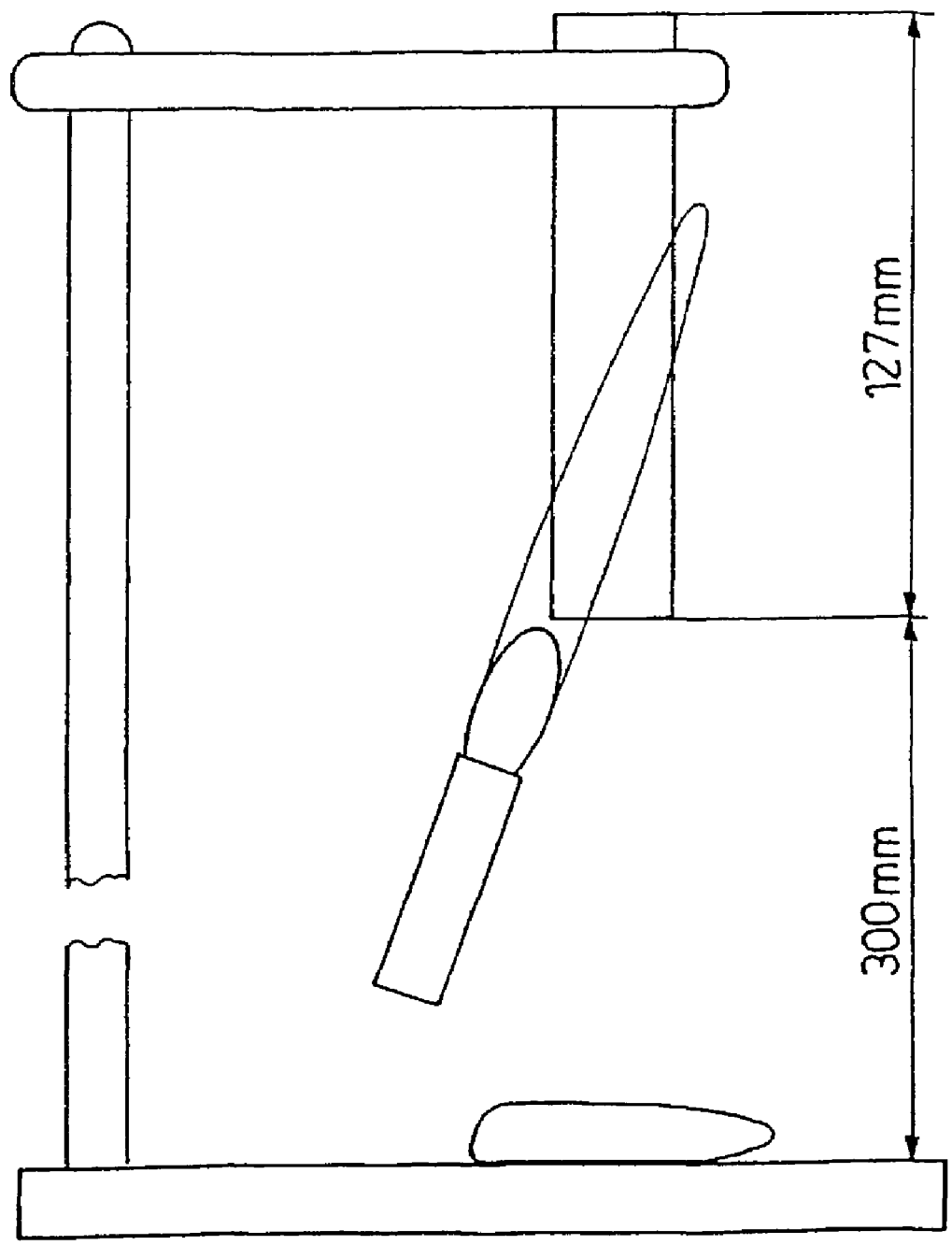

FLAME-RESISTANT INTUMESCENT MIXTURES

FIELD OF THE INVENTION

The invention relates to mixtures containing
a) a polymer which may be produced from ethylene, vinyl acetate and optionally further monomers having a vinyl acetate content in the range of 40 to 85 wt. %,
b) at least one expandable graphite which may be acidic or neutralised,
c) at least one mineral filler,
d) optionally further additives, a process for producing them, their use for the production of shaped articles of any type, and flame-retardant intumescent mixtures containing a mixture according to the invention and, furthermore, shaped articles containing a mixture according to the invention.

BACKGROUND OF THE INVENTION

The term flame-retardant intumescent mixtures refers to foaming flame-retardant mixtures, in other words mixtures which foam to a certain extent upon exposure to fire and have flame-retardant properties.

Mixtures of this type may be used, for example, in joints in buildings and ruptures in cables, cavities, holes, transitions and connections in walls of buildings or fire safety components such as claddings to prevent the spread of the fire, conflagration gases and smoke in the event of fire. Components made of these mixtures are therefore used for preventive fire safety.

The expanding behaviour of these compounds in the event of fire can also make a particular contribution to the preservation of shape or function of, for example, ceiling and wall claddings, because the components are compressed by expanding profiles and sealing members.

These mixtures have to have further properties, for example water resistance. Therefore, conventional flame retardants such as water-soluble polyphosphates are usually undesirable. The extent of foaming also has to remain unchanged over very long storage times.

It is known from JP-B-95068362 to use expanded graphite as flame-retardant component in mixtures of vulcanised acrylate rubber. JP-B2-95103948 describes vulcanised acrylate rubber materials with expanded graphite for producing flame-retardant hoses.

Expanded graphite rubber mixtures based on polychloroprene with 30 phr (per hundred rubber) maximum expanded graphite and therefore excessively small proportions of this filler are described in JP-A-10036572. Furthermore, the use of halogen-containing components is undesirable nowadays.

JP-A-09176579 describes mixtures with EVA (10 to 50% VA) or m-PE with phosphorus and expanded graphite and mineral filler for adhesive tapes round pipes through wall apertures. Red phosphorus is invariably used. However, red phosphorus is difficult to process. In addition, red phosphorus may continue to react after processing.

The object of this invention was to find a phosphorus-free, in particular red phosphorus-free mixture which withstands the necessary fire safety tests, has adequate expanding behaviour, is waterproof and allows simple shaping, for example by extrusion, calendering, compression moulding, etc.

Furthermore, the shaped articles to be produced should have adequate dimensional stability but still be deformable to a certain extent, to still allow adaptation to the protective substrates or insertion into the joints in the component or building during construction and assembly.

A further object was to avoid the need for further vulcanisation or maturing periods to enable the article to be used immediately after shaping. A further object was accordingly to provide unvulcanised mixtures having adequate stability of shape while being deformable to a certain extent by the user.

In addition, it was desired to use substantially halogen-free feedstock for producing these mixtures.

SUMMARY OF THE INVENTION

The objects set are achieved according to the invention by providing mixtures containing,
a) a polymer which may be produced from ethylene, vinyl acetate and optionally further monomers having a vinyl acetate content in the range of 40 to 85 wt. %,
b) at least one expandable graphite which may be acidic or neutralised,
c) at least one mineral filler,
d) optionally further additives.

BRIEF DESCRIPTION OF THE DRAWING

FIG. 1 shows a drawing of a flammability test according to UL 94V-0.

DETAILED DESCRIPTION OF THE INVENTION

It is preferable to use ethylene vinyl acetate copolymers as polymer a).

The polymer a) can be produced by conventional methods, for example by radical copolymerisation in solution, emulsion or mass.

The content of vinyl acetate incorporated by polymerisation should advantageously lie in the range from 50 to 85 wt. %, and mixtures of these polymers with a different vinyl acetate content may also be used.

Ethylene methyl acrylate polymers optionally also containing further comonomers may also be used instead of or in addition to ethylene vinyl acetate polymers optionally containing further comonomers.

To achieve high fire retardance, it is advantageous to use an ethylene vinyl acetate copolymer or an ethylene methyl acrylate copolymer.

Maximum fire retardance is achieved with particularly high contents of polar comonomer.

Further comonomers which are optionally present include, in particular, vinyl esters of higher carboxylic acids and also longer chain (meth)acrylates, the content of these monomers in the polymer generally being higher, the greater the non-polar organic group content in the polymer, to ensure the desired flame retardance. Furthermore, CO is also mentioned as monomer component.

However, the glass transition temperature of the terpolymers obtainable in this way should be taken into consideration when selecting the additional monomers. If it is at ambient temperature or above ambient temperature, mixtures produced from it are generally brittle and therefore difficult to use at typical service temperatures. It is also possible to use so-called acrylate rubbers as polymer a).

A useful upper limit for the glass transition temperature of 15° C. is generally achieved for the ethylene vinyl acetate copolymers containing 85 wt. % of vinyl acetate.

The flexibility of shaped articles made of the mixtures according to the invention can obviously also be influenced by addition of further plasticising additives which are mentioned hereafter.

Expanded graphites produced by sulphatising or nitration of graphite can advantageously be used as so-called expandable graphite b). These expanded graphites are known to a person skilled in the art and can be used for achieving fire retardance in sealing compounds, coatings and in general in thermoplastic materials. They are typically used, for example, in polyurethanes (see the brochure entitled Kurzliefer-programm Flammschutzmittel, Brandschutzartikel, produced by Nordmann and Rassmann in January 2000).

Expanded graphites are layered graphites which can be reacted with sulphuric acid or nitric acid or generally strong acids under oxidising conditions. Water-soluble salts are produced in the layer lattice of the graphite. The reaction with sulphuric acid and $H_2O_2$ is typical. These reaction products are then usually washed free of acid using water, wherein the amount of remaining acid below 1 mg/g is to be measured as KOH. Neutral expanded graphites are obtained by additional neutralisation (for example with sodium hydroxide solution or ammonia), this material also being washed again to remove adhering neutralising agent. Neutral types have a pH of at least 6.

The advantageous use of expanded graphite for fire safety is based on 1. the expansion capacity when exposed to heat. This expansion can exceed 200 ml per g and produces a large surface area. Oxygen is quickly removed from the immediate environment by oxidation and extinction of fire thus achieved.
2. Expanded graphite does not produce a flame during oxidation and is extinguished again immediately when the flame is removed. Expansion in the event of fire seals
3. joints and ruptures and therefore prevents spread of the fire. A person skilled in the art is basically familiar with the criteria for selecting expanded graphites in order to determine expandability and the beginning of expansion. Crucial factors in this connection are the particle size and the type of intercalated material which may usually be sulphuric acid or nitric acid or, more rarely, acetic acid. Therefore, residues of acids are found in acidic expanded graphites and residues of bases, for example sodium hydroxide solution, are contained in alkaline expanded graphites.

The mineral fillers can basically be selected freely, energy-consuming fillers such as aluminium hydroxides, magnesium hydroxides or calcium carbonate providing additional contributions to fire retardance. However, talcum, silicas, silicates, carbonates and sulphates can also be used. Mixtures of the aforementioned fillers may obviously be used.

Typical additives include processing aids such as stearic acid, waxes, lubricating waxes, oils and release agents or also flame-retardant additives such as phosphoric acid ester, ammonium polyphosphates, antimony bromide, etc., halogen-containing fire retardants being less preferred. Water-soluble additives are less preferred owing to the waterproofing.

The use of unneutralised expanded graphites together with ethylene vinyl acetate copolymers can lead to partial hydrolysis with formation of acetic acid. Basic oxides and carbonates or other acid receptors may be added to prevent the liberation of acetic acid.

Non-polar, substantially saturated elastomers such as EPM, EPDM, butyl rubber, hydrated or partially hydrated SBR rubbers can also be used as additives, but advantageously in at most half the amount of a). An advantage of the mixtures is that they allow a relatively wide variation in the amounts of expanded graphite and, in particular, of other mineral fillers which have an energy consuming effect on exposure to fire. Particularly large amounts of components b) and c) can also be achieved in this way. In contrast to the state of the art, surprisingly, component b) can be used in an amount in the range of 50 to 200 parts by weight and component c) in an amount in the range from 50 to 500 parts by weight, based on 100 parts by weight of a) in each case, without sacrificing the good properties, in particular mechanical and processing properties. High demands with regard to fire performance can therefore be achieved. In addition, the raw material costs of such a mixture can be favourably influenced as mineral fillers are usually relatively inexpensive.

The polymers a) used additionally probably have the function of an effective binder which allows large amounts of filler including expanded graphite to be compounded to a processible mixture.

The invention also relates to a process for producing the mixtures according to the invention by mixing the individual components in any sequence in a conventional mixing unit such as an internal mixer, a roller, a screw or a kneader. It may be advantageous to provide cooling during the mixing process to prevent the mixture from becoming too hot. The polymers a) according to the invention allow the production of mixtures without using excessively high shearing forces which could adversely affect the structure of the expanded graphite.

The invention also relates to the use of the mixture for producing shaped articles of any type such as films or sheets of various thickness or profiles of differing geometry, and as a material for cementing joints in buildings and ruptures in cables, cavities, holes, transitions and connections in walls of buildings or for producing fire safety components such as claddings.

An advantage of the mixture according to the invention is that the shaped articles can be produced by continuous processes as the mixtures have a sufficiently wide processing window during processing. This means that, in particular, premature foaming can be avoided during shaping. Extrusion, optionally multi-layer extrusion, and calendering are preferred processing methods. The invention also relates to the aforementioned shaped articles. It may be necessary to vulcanise the mixtures according to the invention in order to produce the shaped articles. This is carried out in a manner known to the person skilled in the art and is described, for example, in "Vulkanisation & Vulkanisationshilfsmittel (W. Hofmann, Leverkusen 1965, p. 85 ff, 225 ff). The vulcanisation system must be selected according to the type of polymer a). Peroxide vulcanisation or, in general, vulcanisation using radical forming agents should be selected in the case of ethylene vinyl acetate copolymers. This includes vulcanisation by high-energy radiation. The normal recommendations can be followed when carrying out vulcanisation in the case of ethylene methyl acrylate copolymers. Sulphur vulcanisation can also be employed if a) contains double bond-containing polymers.

The invention also relates to flame-retardant incumescent mixtures containing a mixture according to the invention.

The following examples serve to illustrate the invention.

EXAMPLES

Feedstock Used:

1. Levapren® 700 HV: ethylene vinyl acetate copolymer containing 70 wt. % vinyl acetate produced by Bayer AG, powdered as granular material with silica, Mooney ML 1+4, 100° C. 27 ME, MFI to DIN 53735 (190° C., 2.16 kp) of about 2.5 g/10 min.
2. Levapren® 800 HV: ethylene vinyl acetate copolymer containing 80 wt. % vinyl acetate produced by Bayer AG, powdered as granular material with silica, Mooney ML 1+4, 100° C. 26 ME, MFI to DIN 53735 (190° C., 2.16 kp) of about 3.0 g/10 min.

3. GRAFguard 160-50 N, expanded graphite produced by Ucar, pH 3, intumescence from 160° C. (onset temperature), content of sulphuric acid as intercalated material 22%.

4. Neutralised expanded graphite 8099 Lte produced by Linetta, pH 6–7 with the following particle size distribution: 5% over 0.50 mm, 20–30% over 0.30 mm, 40–50% over 0.25 mm, 15–25% over 0.18 mm, 5% under 0.18 mm.

Example 1a–e

The mixtures were produced as follows:

The quantities of components of the mixture were calculated for a total quantity of 200 to 300 g.

The mixture was mixed at about 20° C. on a laboratory roller in that the polymer was presented and initially subjected to a few passes through the roller, the stearic acid, expanded graphite and Apyral were then added in succession and the mixture removed from the roller after a total mixing period of 15 min.

Test pieces were pressed from the mixtures, as specified, two different press conditions being selected.

TABLE 1

Batch 1 using Levapren 700 HV, quantities in phr (parts per 100 parts of polymer)

| Example No. | 1a | 1b | 1c | 1d | 1d |
|---|---|---|---|---|---|
| Levapren 700 HV | 100 | 100 | 100 | 100 | 100 |
| Grafguard 160-50 N | 100 | 100 | 100 | 100 | 100 |
| Stearic acid | 2.5 | 2.5 | 2.5 | 2.5 | 2.5 |
| Apyral B 120 | — | 50 | 100 | 200 | 400 |
| Roller temperature 20° C. 15 min | | | | crumbly on the roller but still processable | no mixture obtained |
| Pressing at | 75° C. 30 min | 80° C. 30 min | 80° C. 30 min | 80° C. 30 min | 80° C. 30 min |
| Flame test: determination of intumescence behaviour by exposure to the flame of a gas burner (Soudal Camping Gas, sample at 10 cm from fire pipe, flame treatment time 1 min, dimensions of samples about 100 × 100 × 2 mm) | | | | | |
| | pronounced expansion of surface afterburning of gases pronounced heat transfer buckling on back | uniform slight intumescence with blister formation breaks up in the centre after about 40 s no after-burning pronounced buckling on back | uniform slight intumescence hardly any buckling on the back otherwise as Example 1b | very uniform but slight intumescence no blisters on the back | |
| Pressing at Flame test as above | | 100° C. 30 min hardly any intumescence, surface explodes back very blistered | 100° C. 30 min slight intumescence blistered back | 100° C. 30 min hardly any intumescence hardly any heat transfer no blisters on back dimensionally stable | |

5. Apyral® B 120: aluminium hydroxide produced by Vereinigte Aluminiumwerke
6. Buna® EP G 6170: EPDM rubber produced by Bayer AG with an ethylene content of about 70%, an ENB content of about 1.5% and a Mooney value of ML 1+4, 125° C. of 60 ME.
7. Enerthene® 1849-1: aliphatic plasticiser based on mineral oil produced by BP
8. Disflamol® DPK: plasticiser produced by Bayer AG based on diphenyl cresyl phosphate
9. Maglite D: magnesium oxide produced by C.P. Hall Company
10. Atomite: $CaCO_3$ produced by Thompson, Weinman & Co
11. Rhenosorb®: CaO produced by Rheinchemie A pronounced odour of acetic acid was perceived during production of the mixtures. The test pieces were flexible and could be bent without breaking.

Evaluation of Results:

Intumescence which is as uniform as possible and minimal destruction of the samples is desired. Mixtures 1a to 1b show that mixtures of Levapren and expanded graphite can additionally be highly filled with a flame-retardant filler such as Apyral. The mixtures obtained are readily processable and exhibit uniform intumescence in the flame test. Mixtures 1c and 1d are particularly good here. The formation of blisters or buckling during the flame test depends on the pressing conditions. In mixture 1d, with 400 phr, the optimum quantity of Apyral is obviously exceeded. To avoid heat transfer, it is obviously advantageous to use Apyral, the quantity preferably being 50 phr or higher.

Example 2a–e (Comparison)

The mixtures were produced as in Example 1 but the temperature set at 50° C. during production of the mixture.

It was found that only mixtures with up to 70 phr expanded graphite could be produced. The test pieces obtained had a very irregular surface. This could sometimes be improved if pressing was carried out at elevated temperature (100° C.) and for a prolonged period (30 min).

Evaluation of Results:

Processible mixtures may be obtained with EPDM only with expanded graphite quantities below 70 phr. Acceptable shaped articles could be obtained only after prolonged pressing, but blistering was then observed in the flame test. The mixture was extremely difficult to produce owing to poor filler/expanded graphite uptake. In contrast to mixing batch 1, it will probably be difficult to bring mixtures from batch 2 into the manifold forms desired by the user.

TABLE 2

Batch 2 using EPDM

| Example No. | 2a | 2b | 2c | 2d | 2e |
|---|---|---|---|---|---|
| Buna EP G 6170 | 100 | 100 | 100 | 100 | 100 |
| Grafguard 160-50 N | 70 | 70 | 70 | 70 | 70 |
| Enerthene 1849-1 | 5 | 5 | 5 | 5 | 5 |
| Apyral B 120 | — | 50 | 100 | 200 | 400 |
| Roller temperature 50° C. 15 min | crumbly on the roller, the test pieces had a very irregular surface | | | | no mixture obtained |
| Pressing | 80° C. 15 min | 80° C. 15 min | 80° C. 15 min | 80° C. 15 min | 80° C. 15 min |
| Flame test: determination of intumescence behaviour by exposure to the flame of a gas burner (Soudal Camping Gas, sample at 10 cm from fire pipe, flame treatment time 1 min, dimensions of samples about 100 × 100 × 2 mm) | | | | | |
| | very good intumescence, pronounced expanded graphite jets no afterburning of gases hardly any heat transfer no blisters on back | slight intumescence with blistering hardly any heat transfer no blistering on back | pronounced deformation is soft pronounced intumescence continues to smoke for a long time | pronounced intumescence hardly any deformation continues to smoke for a long time afterglow of intumescent layer | |
| Pressing Flame test | | 100° C. 30 min hardly any intumescence, surface explodes back very blistered | 100° C. 30 min slight intumescence blistered back | 100° C. 30 min hardly any intumescence hardly any heat transfer no blisters on back dimensionally stable | |

It was only possible to produce mixtures with up to 70 phr of expanded graphite. As shown in the table, Enerthene 1849-1, a mineral oil, had to be added.

An attempt was also made to use a flame-retardant processing aid with Disflamol DPK (diphenyl cresyl phosphate). It is found that this aid was not compatible with the compound and even complicated incorporation of the expanded graphite. The highly filled EPDM compounds continued to smoke and this was a disadvantage for the application according to the invention.

The additions of Apyral surprisingly impaired the fire performance because after-glowing was observed.

Example 3a–m

The mixtures were produced as in Example 1. The feedstock was mixed in on the roller in the sequence as in the table.

TABLE 3

Using Levapren 700 HV with addition of acid receptors

| Example No. | 3a | 3b | 3c | 3d | 3e | 3f | 3g | 3h | 3i | 3k | 3l | 3m |
|---|---|---|---|---|---|---|---|---|---|---|---|---|
| Levapren 700 HV | 100 | 100 | 100 | 100 | 100 | 100 | 100 | 100 | 100 | 100 | 100 | 100 |
| Grafguard 160-50 N | 100 | 100 | 100 | 100 | 100 | | | | | | 50 | |

TABLE 3-continued

Using Levapren 700 HV with addition of acid receptors

| Example No. | 3a | 3b | 3c | 3d | 3e | 3f | 3g | 3h | 3i | 3k | 3l | 3m |
|---|---|---|---|---|---|---|---|---|---|---|---|---|
| Expanding graphite neutral | | | | | | 100 | 100 | 100 | 100 | 100 | | 50 |
| Apyral B 120 | | 50 | | | | | 100 | | | | 100 | 100 |
| Maglite D MgO | | | 5 | | | | | 5 | | | | |
| Atomite CaCO3 | | | 5 | | | | | | 5 | | | |
| Rhenosorb CaO | | | | 5 | | | | | | 5 | 5 | 5 |
| Roller temperature 20° C. |||||||||||||
| 15 min |||||||||||||
| Pressing |||||||||||||
| 75° C. 15 min |||||||||||||

The odour of acetic acid was not perceived during production of the mixtures. The samples from Examples 3a to 3m were tested in accordance with UL 94V-0 (Underwriter Laboratories, see FIG. 1). The samples were flame treated at an angle of 20° for a flame treatment time of 10 s with a flame height of 20 mm at about 950° C. After extinction, flame treatment was repeated for 10 s and a cycle time of 5 s.

increases flame retardance, as demonstrated by extremely low destruction of material.

An odour of acetic acid as in Example 1, which can be explained by partial hydrolysis of the Levapren, can be avoided by addition of a mineral basic acid receptor or by the use of neutral expanded graphite.

TABLE 4

Method:
Flame height 20 mm; about 950° C. - flame treatment
for 10 s in each case - repeated flame treatment after extinction
Cycle times 5 s

| Samples | 3a | 3b | 3b-1 | 3c | 3d | 3e | 3f | 3g | 3h | 3i | 3k | 3l | 3m |
|---|---|---|---|---|---|---|---|---|---|---|---|---|---|
| Duration of burning after first flame treatment | <10 s | <10 s | <10 s | <10 s | <10 s | <10 s | <10 s | <10 s | <10 s | <10 s | <10 s | <10 s | <10 s |
| Further flame treatments until ignition | 2 – no ignition | 2 – no ignition | 2 – no ignition | 2 – no ignition | 2 – no ignition | 2 – no ignition | 2 – no ignition | 2 – no ignition | 2 – no ignition | 2 – no ignition | 2 – no ignition | 2 – no ignition | 2 – no ignition |
| Duration of glow after second flame treatment | <30 s | <30 s | <30 s | <30 s | <30 s | <30 s | <30 s | <30 s | <30 s | <30 s | <30 s | <30 s | <30 s |
| Total burning period | <30 s | <30 s | <30 s | <30 s | <30 s | <30 s | <30 s | <30 s | <30 s | <30 s | <30 s | <30 s | <30 s |
| Softening/dripping | none | slight softening | none | none | none | none | none | none | none | none | none | none | none |
| Destroyed sample length after extinction (cone size) | 2.5 × 2.2 cm | 2.5 × 2.3 cm | 2.7 × 1.8 cm | 3.5 × 2.0 cm | 2.4 × 1.9 cm | 2.0 × 1.2 cm | 3.0 × 2.4 cm | 2.3 × 1.8 cm | 4.0 × 1.7 cm | 3.7 × 1.7 cm | 3.5 × 1.5 cm | 2.0 × 1.5 cm | 1.5 × 1.3 cm |
| Continued burning of dripped material | no | no | no | no | no | no | no | no | no | no | no | no | no |

Sample 3b-1 was pressed at 80° C. rather than 75° C.

The results of this test show that excellent flame retardance can be achieved. Adequate intumescence is also found, in order to create the necessary seal in the event of fire. Additional finish involving flame-retardant components such as phosphate esters or antimony compounds etc. is not necessary. The mixtures are halogen free.

It was also found in Example 3l and 3m that an exceptionally high degree of filling is possible with Apyral as a typical representative of a mineral filler. This further

TABLE 5

Tests with Levapren 800 HV

Preliminary tests were carried out with

| | | |
|---|---|---|
| a) | Levapren 800 HV | 100 parts |
| | Expanded graphite, neutralised | 100 parts |
| | Stearic acid | 2.5 parts |
| and | | |
| b) | Levapren 700 HV | 100 parts |
| | Expanded graphite, neutralised | 100 parts |
| | Stearic acid | 2.5 parts |

The roller temperature was 20° C. and the press temperatures 70, 75, 80, 100 and 150° C. The processibility of the compounds was good.

Levapren 800 HV can be used for intumescent mixtures, similarly to Levapren 700 HV. However, the constitution of the sheets/test pieces was more homogeneous with Levapren 700 HV.

It has generally been found that all EVA compounds could be processed more readily than the corresponding EPDM compounds.

The invention claimed is:

1. Mixture, comprising
    a) a polymer which is produced from ethylene, vinyl acetate, methyl acrylate and optionally further monomers, having a vinyl acetate content in the range of 40 to 85 wt. %;
    b) at least one expandable graphite which is acidic or neutralized;
    c) at least one mineral filler; and
    d) optionally further additives,
   wherein component b) is used in an amount in the range of 50 to 200 parts by weight and component c) in an amount in the range of 50 to 500 parts by weight based on 100 parts by weight of a) in each case and
   wherein the mixture does not comprise phosphorous or a phosphorous compound.

2. A mixture according to claim 1, wherein polymer a) has a vinyl acetate content in the range of 60 to 80 wt. %.

3. A mixture according to claim 1, wherein said mineral filler c) is an inorganic hydroxide or oxide or a mixture thereof.

4. A mixture according to claim 1, wherein said expandable graphite is a mixture of one or more acidic or neutralized expandable graphites.

5. A mixture according to claim 1, wherein said further additives are processing auxiliaries in amounts smaller than or equal to 10 phr based on polymer.

6. A mixture according to claim 1, wherein further flame-retarding additives are additionally used in quantities smaller than or equal to 100 phr based on polymer.

7. Mixture, comprising
    a) a polymer which is produced from ethylene, methyl acrylate and optionally further monomers,
    b) at least one expandable graphite which is acidic or neutralized;
    c) at least one mineral filler; and
    d) optionally further additives,
   wherein component b) is used in an amount in the range of 50 to 200 parts by weight and component c) in an amount in the range of 50 to 500 parts by weight, based on 100 parts by weight of a) in each case and
   wherein the mixture does not comprise phosphorous or a phosphorous compound.

8. A mixture according to claim 7, wherein the polymer produced from ethylene, methyl acrylate and optionally further monomers has a methyl acrylate content in the range of 40 to 85 wt. %.

9. A process for producing a mixture according to claim 1, wherein the components are mixed in a mixing rotor.

10. A shaped article comprising a mixture which comprises
    a) a polymer which is produced from ethylene, vinyl acetate, methyl acrylate and optionally further monomers, having a vinyl acetate content in the range of 40 to 85 wt. %;
    b) at least one expandable graphite which is acidic or neutralized;
    c) at least one mineral filler; and
    d) optionally further additives,
   wherein component b) is used in an amount in the range of 50 to 200 parts by weight and component c) in an amount in the range of 50 to 500 parts by weight, based on 100 parts by weight of a) in each case,
   wherein the mixture does not comprise phosphorous or a phosphorous compound.

11. A shaped article according to claim 10, wherein said shaped article is used as material for cementing joints in buildings and ruptures in cables, cavities, holes, transitions and connections in walls of buildings or production of fire safety components.

12. Flame-retardant intumescent mixtures comprising a mixture which comprises
    a) a polymer which is produced from ethylene, vinyl acetate, methyl acrylate and optionally further monomers, having a vinyl acetate content in the range of 40 to 85 wt. %;
    b) at least one expandable graphite which is acidic or neutralized;
    c) at least one mineral filler; and
    d) optionally further additives,
   wherein component b) is used in an amount in the range of 50 to 200 parts by weight and component c) in an amount in the range of 50 to 500 parts by weight, based on 100 parts by weight of a) in each case, and
   wherein the mixture does not comprise phosphorous or a phosphorous compound.

13. A mixture according to claim 1, wherein the polymer produced from ethylene, methyl acrylate and optionally further monomers has a methyl acrylate content in the range of 40 to 85 wt. %.

14. A shaped article comprising a mixture which comprises
    a) a polymer which is produced from ethylene, methyl acrylate and optionally further monomers, having a methyl acrylate content in the range of 40 to 85 wt. %;
    b) at least one expandable graphite which is acidic or neutralized;
    c) at least one mineral filler; and
    d) optionally further additives,
   wherein component b) is used in an amount in the range of 50 to 200 parts by weight and component c) in an amount in the range of 50 to 500 parts by weight based on 100 parts by weight of a) in each case,
   wherein the mixture does not comprise phosphorous or a phosphorous compound.

15. Flame-retardant intumescent mixtures comprising a mixture which comprises
    a) a polymer which is produced from ethylene, methyl acrylate and optionally further monomers, having a methyl acrylate content in the range of 40 to 85 wt. %;
    b) at least one expandable graphite which is acidic or neutralized;
    c) at least one mineral filler; and
    d) optionally further additives,
   wherein component b) is used in an amount in the range of 50 to 200 parts by weight and component c) in an amount in the range of 50 to 500 parts by weight, based on 100 parts by weight of a) in each case, and
   wherein the mixture does not comprise phosphorous or a phosphorous compound.

* * * * *